E. SCHNEIDER.
CHAIN DRIVE.
APPLICATION FILED JUNE 21, 1916.
1,258,472.
Patented Mar. 5, 1918.
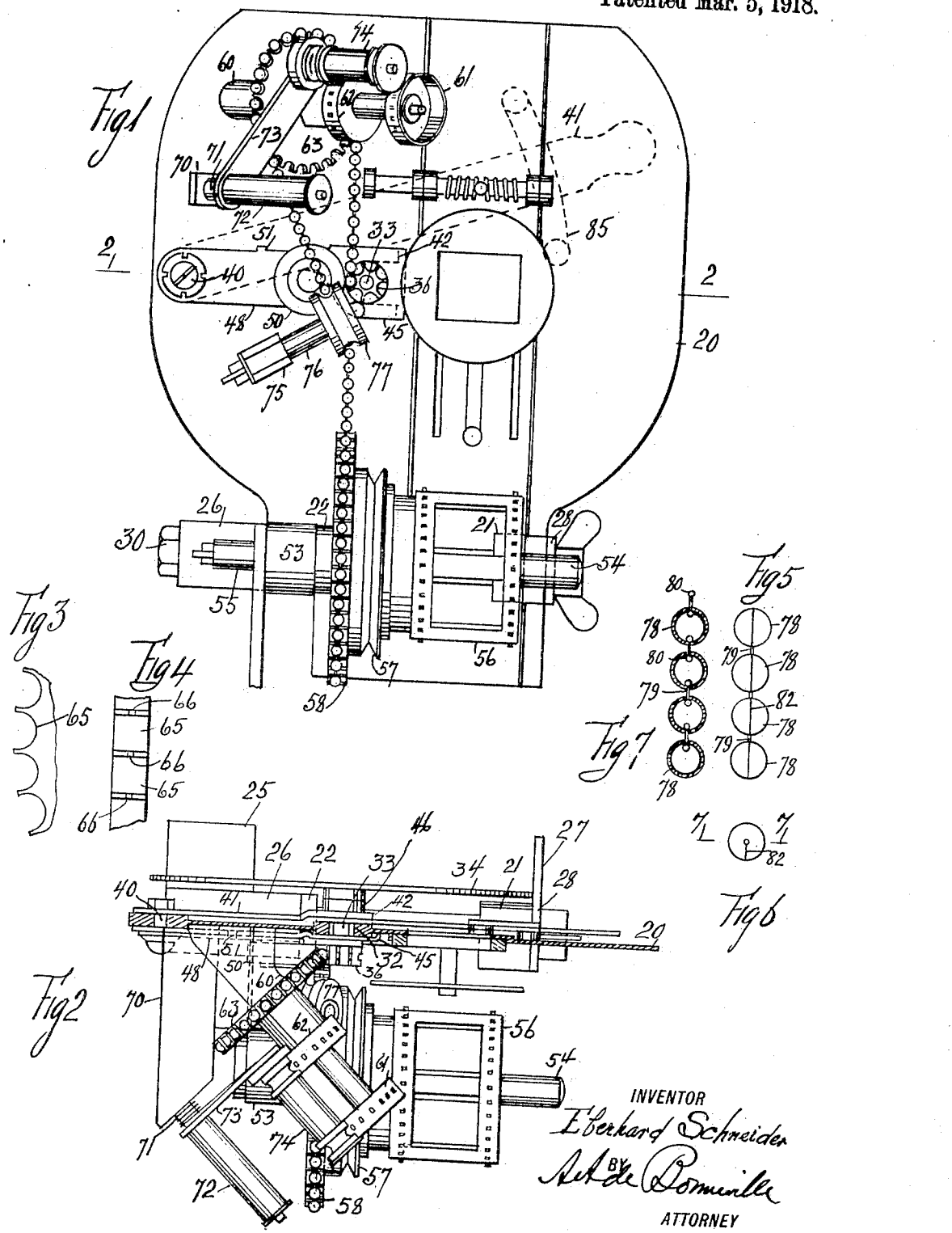
INVENTOR
Eberhard Schneider
BY
ATTORNEY

UNITED STATES PATENT OFFICE.

EBERHARD SCHNEIDER, OF NEW YORK, N. Y.

CHAIN DRIVE.

1,258,472. Specification of Letters Patent. Patented Mar. 5, 1918.

Original application filed February 19, 1914, Serial No. 819,607. Divided and this application filed June 21, 1916. Serial No. 104,866.

*To all whom it may concern:*

Be it known that I, EBERHARD SCHNEIDER, a citizen of the United States, and a resident of the borough of Manhattan, in the county of New York and State of New York, have invented certain new and useful Improvements in Chain Drives, of which the following is a specification.

This invention relates to a chain drive which is adapted to mechanisms with shafts inclined to each other. It is particularly adapted to moving picture projecting machines and cameras. In the present application the invention is shown with a moving picture projecting apparatus.

Figure 1 represents an elevation of the frame plate of a moving picture projecting apparatus with the invention incorporated therewith; Fig. 2 shows a top plan view of Fig. 1 with a partial section on the line 2, 2 of Fig. 1; Fig. 3 represents an enlarged elevation of a detail; Fig. 4 is a right hand side view of Fig. 3; Fig. 5 shows an enlarged elevation of a detail; Fig. 6 is a top plan view of Fig. 5 and Fig. 7 is a partial section of Fig. 6 on the line 7, 7.

A frame plate 20 of a moving picture projecting apparatus has formed therewith the journal brackets 21, 22. A supporting frame is shown with the member 25 having the journal bracket 26 and the member 27 having the journal bracket 28, a hinge bolt 30 extending through the bearings 21, 22, 26 and 28, thereby enabling the frame plate 20 to swing relatively to the supporting frame. An opening 32 is formed in the frame plate 20 for the spindle 33, that carries at one end the shutter 34. A sprocket pinion 36 is fastened to the other end of the spindle 33.

A pivot 40 is supported in the plate 20. An adjusting arm 41 with the bifurcated lug 42 is fastened to one end of said pivot on one side of the frame plate 20 and an arm 45 is fastened to the other end of the pivot 40 and on the opposite side of the said frame plate. The spindle 33 is supported on the arm 45. A washer 46 is supported on the spindle 33 and the latter is engaged by the bifurcated lug 42. An arm 48 is pivoted on the pivot 40 and has journaled on its swinging end the guide roller 50. A lug 51 on the arm 48 can engage the arm 45. By means of the adjusting arm 41 the sprocket pinion 36 and guide roller 50 can be located in different positions.

From the frame plate 20 extends a bracket 53 that carries a pin 54 that has a threaded end for the wing nut 55. A sprocket drum 56 with a pulley 57 and the sprocket wheel 58 is journaled on the pin 54.

From the frame plate 20 extends preferably at an angle of forty-five degrees the journal bracket 60 to which is journaled the upper sprocket drums 61 and 62 and sprocket wheel 63. Both the said sprocket wheels 58 and 63 have formed on their peripheries the curved bearing surfaces 65, and notches 66 are formed in the ridges between said surfaces. The said notches engage the links of the chain to be described. A bracket 70 extends from the frame plate 20. A pivot 71 extends from the bracket 70 on which is journaled a guide roller 72. An arm 73 extends from the pivot 71 and has pivoted to its swinging end a clamping roller 74.

A bracket 75 extends from the frame plate 20 and adjustably supports a pivot 76, on which latter is journaled a guide pulley 77.

The sprocket chain comprises the hollow balls 78, flexibly connected by the links 79 having upset ends 80.

In the manufacture of the balls 78 they are split on the line 82 to enable the links 79 to be located in place. The chain extends under the sprocket wheel 58 passes up under the guide pulley 77 and from thence over the sprocket wheel 63, and then extends between the guide roller 50 and the sprocket pinion 36, and from the latter returns to the sprocket wheel 58. A guide sector 85 extends from the frame plate 20 for the adjusting arm 41.

The operation of the invention is evident from the description of the parts, and it will be noted that the chain with the balls 78 efficiently connects the sprocket wheels 58 and 63 which have their axes inclined to each other. The engagement of the links 79 with the notches 66 securely connects the chain with the sprocket wheels 58 and 63.

This application is a division of a pending application of the applicant for moving picture projecting apparatus, 819,607, filed February 19th, 1914.

Having described my invention what I desire to secure by Letters Patent and claim is:

1. The combination of sprocket chain wheels, a sprocket pinion, the said wheels and pinion each having curved surfaces in its periphery and notches in the ridges between said curved surfaces, a chain comprising balls and links connecting the wheels and pinion, the balls engaging said curved surfaces and the links engaging said notches, a guide roller for the chain coacting with said pinion and a guide pulley for the chain located between the sprocket wheels.

2. The combination of sprocket wheels, a sprocket pinion, means to locate the pinion in different positions, a chain connecting said wheels and pinion, a guide roller for the chain coacting with said pinion, means to locate the roller in different positions and a guide pulley for the chain located between the sprocket wheels.

Signed at the borough of Manhattan, in the county of New York and State of New York, this 15th day of May, A. D. 1916.

EBERHARD SCHNEIDER.

Witnesses:
A. A. DE BONNEVILLE,
VICTOR MILLER.

Copies of this patent may be obtained for five cents each, by addressing the "Commissioner of Patents, Washington, D. C."